(12) United States Patent
Jim et al.

(10) Patent No.: US 8,917,733 B2
(45) Date of Patent: Dec. 23, 2014

(54) USING WIRELESS WIDE AREA NETWORK PROTOCOL INFORMATION FOR MANAGING A PERFORMANCE LEVEL OF A PROCESSOR

(75) Inventors: Samson Jim, San Diego, CA (US); Thomas Klingenbrunn, San Diego, CA (US); Chih-ping Hsu, San Diego, CA (US); Chaitanya Bhartan Shah, San Diego, CA (US); Farhan Muhammad Aziz, Atlanta, GA (US); Navid Ehsan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 13/311,997

(22) Filed: Dec. 6, 2011

(65) Prior Publication Data
US 2013/0142049 A1     Jun. 6, 2013

(51) Int. Cl.
*H04L 12/28*     (2006.01)

(52) U.S. Cl.
USPC ........................................ 370/395.7; 370/469

(58) Field of Classification Search
CPC ....... H04L 63/08; H04L 12/14; H04W 12/08; H04W 4/26; G06F 15/177
See application file for complete search history.

(56) References Cited

U.S. PATENT DOCUMENTS

| | | | |
|---|---|---|---|
| 7,073,079 B1 | 7/2006 | Karsi et al. | |
| 8,463,578 B2 * | 6/2013 | Circenis | 702/178 |
| 2008/0028249 A1 * | 1/2008 | Agrawal | 713/501 |
| 2008/0291838 A1 | 11/2008 | Jaakkola et al. | |
| 2009/0316904 A1 * | 12/2009 | Klingenbrunn et al. | 380/274 |
| 2010/0069128 A1 | 3/2010 | Cheng et al. | |

OTHER PUBLICATIONS

International Search Report and Written Opinion—PCT/US2012/068036—ISA/EPO—Mar. 25, 2013.

* cited by examiner

*Primary Examiner* — Jung Park
(74) *Attorney, Agent, or Firm* — Eric Ho

(57) ABSTRACT

Methods and apparatuses are provided for managing a performance level of a processing circuit, such as a modem, by making adjustments to one or more operating parameters provided to the processing circuit, such as a voltage supplied to the processing circuit and/or a clock frequency of the processing circuit. The processing circuit is adapted to monitor wireless wide area network (WWAN) protocol information. The processing circuit may adjust at least one operating parameter provided to the processing circuit in response to the monitored wireless wide area network (WWAN) protocol information.

45 Claims, 7 Drawing Sheets

USING WIRELESS WIDE AREA NETWORK PROTOCOL INFORMATION FOR MANAGING A PERFORMANCE LEVEL OF A PROCESSOR

BACKGROUND

1. Field

Various features disclosed herein pertain to wireless communication systems, and at least some features pertain to devices and methods for facilitating performance level management for a processing circuit in an access terminal.

2. Background

Access terminals, such as laptop computers, personal digital assistant devices, mobile or cellular phones, or any other device with a processor, that communicate with other devices through wireless signals are becoming increasingly popular. Access terminals are typically battery-powered and the amount of power a battery can provide is limited. With consumers using powerful applications that run on the client terminals, particularly entertainment media and imaging applications, conserving battery power is important.

One technique often used in computer architecture for conserving power and/or reducing the temperature of a processor includes managing a performance level of one or more processors. For example, the performance level of a processor may be managed by dynamic frequency scaling and/or dynamic voltage and frequency scaling. Dynamic voltage and frequency scaling is generally implemented in devices having a processor by increasing or decreasing the clocking frequency of the processor or a combination of the clocking frequency and the voltage supplied to the processor in response to the activity of the processor. For example, the processor and/or memory bus activity may be monitored to determine whether additional or fewer processor resources are needed to meet the current activity rates. When relatively higher processor and/or memory bus activity is measured, the dynamic voltage and frequency scaling function may increase the clock frequency of the processor and/or the voltage supplied to the processor to enable the processor to meet the demands of the increased activity. Conversely, when relatively lower processor and/or memory bus activity is measured, the dynamic voltage and frequency scaling function may reduce the clock frequency of the processor and/or the voltage supplied to the processor. Such reductions in frequency and/or voltage may result in reduced power consumption by the processor, as power is dissipated by a processor according to the equation $C \cdot V^2 \cdot f$, where C is the capacitance being switched per clock cycle, V is voltage, and f is the switching frequency.

Such a conventional dynamic voltage and frequency scaling function which monitors the processor and memory bus activity may be capable of reducing power consumption in access terminals. However, such a conventional dynamic voltage and frequency scaling function may not perform optimally in high speed data transmission scenarios, such as high-speed calls. For example, in modern high speed data call scenarios, data may be transferred between an access terminal and an access node over relatively short periods of time. If data remains for too long on a buffer at an access terminal (e.g., is not moved quickly enough from a buffer having limited storage capacity to a storage medium having a larger storage capacity), the data may be partially overwritten by subsequent data received at the access terminal, resulting in the loss of data. Similarly, if data is not processed quickly enough for transmission, the access terminal may miss a transmission deadline, potentially leading to system instability. In some conventional data transmission scenarios, only a few milliseconds may be available to process data before data is lost or transmission deadlines are missed.

Conventional dynamic voltage and frequency scaling functions relying on measurements of processor and memory bus activity levels may have relatively slow responsiveness in adjusting processor performance levels.

Therefore, there is a need for a solution that more efficiently manages a processor's performance level, e.g., during high speed data transmission/reception scenarios, by identifying a change in processor requirements and enabling relatively quick responsiveness in adjusting the processor's performance level to meet the changed processor requirements.

SUMMARY

Managing the performance level of a processing circuit in an access terminal is facilitated by monitoring wireless wide area network (WWAN) protocol information. An activity rate of a processing circuit and an activity rate of a memory bus may additionally be monitored.

One feature provides a modem device adapted to facilitate performance level management of a processing circuit in an access terminal. The modem device may include a wireless communication interface such as a transceiver. A memory device may be adapted to implement a wireless wide area network (WWAN) protocol stack for the wireless communication interface. A processing circuit may be communicatively coupled to the wireless communication interface and to the memory device. The processing circuit may be adapted to monitor a wireless wide area network (WWAN) protocol information from the wireless wide area network (WWAN) protocol stack. In response to the monitored wireless wide area network (WWAN) protocol information, the processing circuit may adjust at least one operating parameter provided to the processing circuit. Such a processing circuit may comprise a modem processor.

While monitoring the wireless wide area network (WWAN) protocol information, the processing circuit may monitor at least one of a downlink physical transport block size, an uplink scheduling grant, an automatic repeat request (ARQ) window size, or a transmission buffer status. The processing circuit may monitor the wireless wide area network (WWAN) protocol information by monitoring a signaling/control channel for one or more signaling/control messages conveyed between the access terminal and an access node.

The processing circuit may be further adapted to measure an activity rate of at least one of the processing circuit or a memory bus coupled to a memory device. Measuring the activity rate of the processing circuit may include measuring a percentage of idle clock cycles for the processing circuit. Measuring the activity rate of the memory bus may include measuring an amount of read/write commands on the memory bus and an average delay time to execute the read/write commands. The processing circuit may adjust the at least one operating parameter provided to the processing circuit in response to the activity rate of the at least one of the processing circuit or the memory bus in addition to the wireless wide area network (WWAN) protocol information.

The at least one operating parameter provided to the processing circuit may include at least one of a voltage supplied to the processing circuit or a clock frequency of the processing circuit, and the processing circuit may be adapted to increase the voltage supplied to the processing circuit when the clock frequency of the processing circuit is increased and/or to decrease the clock frequency of the processing circuit when the voltage supplied to the processing circuit is decreased.

A method operational in a modem device is also provided according to one feature for managing a performance level of a processing circuit. For instance, wireless wide area network (WWAN) protocol information may be monitored. In response to the monitored wireless wide area network (WWAN) protocol information, at least one operating parameter provided to a processing circuit may be adjusted.

One feature provides a modem device including means for transmitting and/or receiving wireless communications. The modem device may further include means for monitoring wireless wide area network (WWAN) protocol information. Means are provided for adjusting at least one operating parameter provided to a processing circuit in response to the monitored wireless wide area network (WWAN) protocol information.

A non-transitory processor readable medium is provided comprising one or more instructions operational on a modem device according to one feature for managing a processor performance level. When executed by a processor, the one or more instructions may cause the processor to monitor wireless wide area network (WWAN) protocol information. The one or more instructions may further cause the processor to adjust at least one operating parameter provided to the processing circuit in response to the monitored wireless wide area network (WWAN) protocol information.

DETAILED DESCRIPTION

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation. The terms "access node" and "access terminal" as used herein are meant to be interpreted broadly. For example, an "access node" may refer to a device that facilitates wireless connectivity (for one or more access terminals) to a communication or data network. Examples of "access nodes" may include base stations, Node-B devices, femto cells, pico cells, etc. Furthermore, an "access terminal" may include mobile phones, pagers, wireless modems, personal digital assistants, personal information managers (PIMs), palmtop computers, laptop computers, and/or other mobile communication/computing devices which communicate, at least partially, through a wireless or cellular network.

Overview

One feature provides apparatuses and methods for facilitating performance level management for one or more processing circuits by monitoring a wireless wide area network (WWAN) protocol stack to identify a change in desired processor resources. An access terminal may include a modem device having a memory device coupled to a memory bus and a processing circuit. The processing circuit may be adapted to monitor WWAN protocol information (e.g., monitor activity, traffic, and/or other conditions of a WWAN protocol stack). In addition to monitoring WWAN protocol information, the processing circuit may also be adapted to monitor an activity rate of the processing circuit and/or an activity rate of a memory bus. The processing circuit may be further adapted to determine whether to adjust a performance level of the processing circuit in response to at least the monitored WWAN protocol information. According to at least one feature, the modem device may be enabled to identify a change in expected processor requirements before the increase or decrease in processor resources is needed, resulting in improved responsiveness to resource requirements. In one example, the processor may be a communication or modem processor.

Exemplary Network Environments

Figure 1:
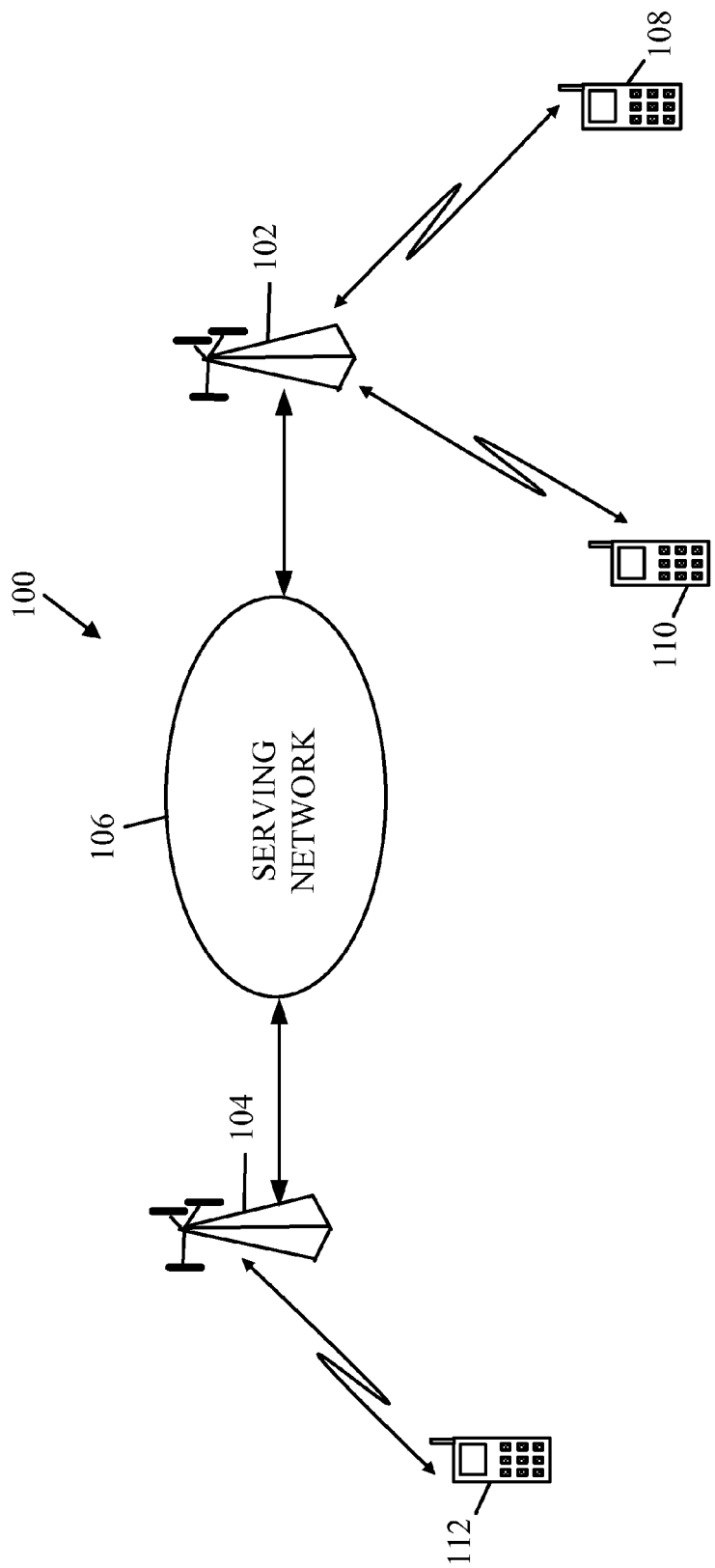
FIG. 1 is a block diagram illustrating how one or more access terminals may operate within a communication network.

FIG. 1 is a block diagram illustrating how one or more access terminals may operate within a communication network. A communication network 100 may include one or more access nodes 102 and 104 communicatively coupled to a serving network 106. The serving network 106 may include one or more network infrastructure devices that facilitate subscriber authentication, session setup, call routing, data or content delivery, etc. The serving network 106 may also be coupled to other networks to provide services across different territories and/or networks.

One or more access terminals 108, 110, and 112 may obtain service and/or communicate over the serving network 106 via the access nodes 102 and 104. Although just three access terminals 108, 110, and 112 are depicted, it is to be appreciated that the communication network system 100 may service any number of access terminals. According to various implementations, the serving network 106 may support high data rate services to/from the access terminals 108, 110, and 112.

In one example, one or more of the access terminals 108, 110 and 112 may include one or more processors (e.g., CPU, modem processors, communication processors, transceiver devices, etc.) and may be adapted to perform one or more techniques to manage a performance level of the one or more processors by monitoring an activity rate of a processing circuit, an activity rate of a memory bus, and/or one or more characteristics of a Wireless WAN (WWAN) protocol stack. For instance, the WWAN protocol stack may be a buffer that is coupled to (or part of) a transmitter and/or receiver chain for an access terminal. The performance of one or more processors of the access terminal may be adjusted and/or modified based on the transmission/reception activity (or other characteristics) perceived in the WWAN protocol stack buffer.

Note that a communication link or channel from an access point to an access terminal is often referred to as a forward link or downlink. A communication link or channel from an access terminal to an access point may be referred as a reverse link or the uplink.

Exemplary Access Terminal

Figure 2:
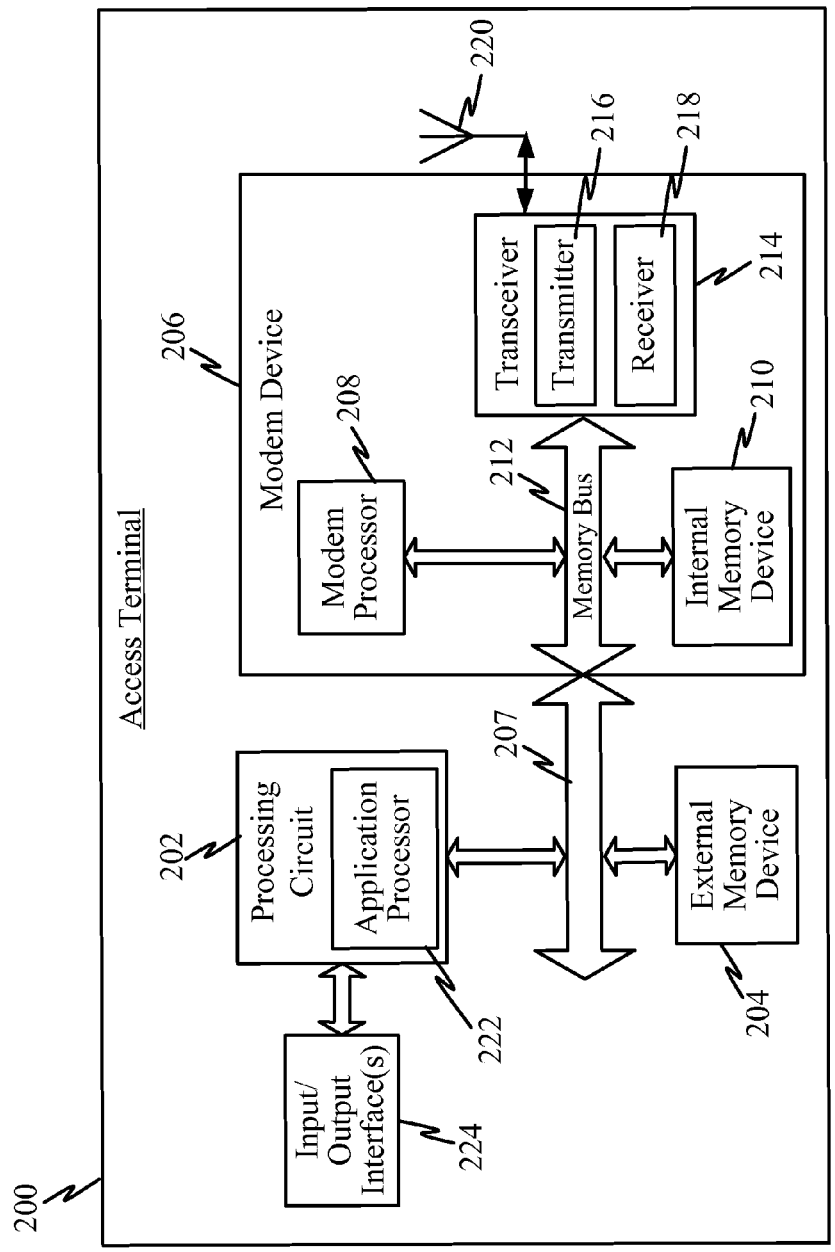
FIG. 2 is a block diagram illustrating one example of an access terminal.

FIG. 2 is a block diagram illustrating one example of an access terminal. The access terminal 200 may include a processing circuit 202, a memory device 204 and a modem device 206, each of which may be coupled to a common data bus 207. The modem device 206 may include a modem processor 208 and an internal memory device 210 (e.g., buffer) coupled to a memory bus 212, which memory bus 212 may also enable interconnectivity with the data bus 207. In order to avoid confusion between the memory device 204 and the internal memory device 210 of the modem device 206, the memory device 204 may be referred to herein as an external memory device 204. The modem device 206 further includes a transceiver 214 (e.g., transmitter 216 and receiver 218 modules) that is coupled to the memory bus 212 and to an antenna 220. The transceiver 214 may form at least a portion of a wireless communication interface, and use of the term "wireless communication interface" herein refers to at least the transceiver 214.

The processing circuit 202, modem processor 208 and/or transceiver 214 may form a transmit chain and/or a receive chain that operates to process, transmit and/or receive one or more concurrent or serial data streams to and/or from the access terminal 200. In one example, each data stream may be transmitted/received over a respective transmit/receive antenna. For data to be transmitted, the modem processor 208 may modulate the data by formatting, coding, and/or interleaving the traffic data for each data stream based on a particular coding scheme selected for that data stream to provide coded data. Similarly, for received data, the modem processor 208 may demodulate the data by de-interleaving, decoding, and/or extracting the traffic data for each data stream based on the particular coding scheme being used. At the transceiver 214, the transmitter module 216 may processes a data stream to provide one or more analog signals and may further condition (e.g., amplify, filter, and/or up convert) the analog signals to provide a modulated signal suitable for transmission over the antenna 220. Similarly, the receiver module 218 may receive modulated signals from the antenna 220 and may condition (e.g., filter, amplify, and/or downconvert) a received signal, digitize the conditioned signal to provide samples, and further process the samples to provide a corresponding received data stream.

The processing circuit 202 may include one or more processors, such as an application processor 222 that executes applications on the access terminal 200. The processing circuit 202 may also be coupled to one or more input/output interfaces 224. The input/output interfaces 224 may include a display screen, a microphone, a speaker, a keypad, a touch screen, among other interfaces, as well as combinations thereof.

In at least some implementations, the modem processor 208 and the application processor 222 may reside on the same processing circuit 202 or the same circuit board of the access terminal 200. In other implementations, the modem processor 208 and the application processor 222 may be located on separate circuit boards. For instance, the modem processor 206 may be part of an independent or removable communication card that plugs into the access terminal 200. Moreover, each of the modem processor 208 and/or application processor 222 may be implemented as a single processor or multiple processors.

According to at least some implementations, the access terminal 200 may be adapted to comply with 3G and/or 4G wireless wide area network (WWAN) communication standards employing high speed data access technologies. For example, the access terminal 200 may be adapted to comply with WWAN communication standards such as High Speed Packet Access (HSPA), Evolved HSPA (HSPA+), Evolution-Data Optimized (EV-DO), or Long Term Evolution (LTE), as well as combinations thereof.

Exemplary Processor Management Based on WWAN Protocol Stack Characteristics

According to one feature of the access terminal 200, the modem processor 208 and/or the processing circuit 202 may be adapted to manage a performance level of the modem processor 208 in response to an identified change in the processing resources that may be needed to avoid overwriting data and/or missing a transmission timing deadline. For example, the modem processor 208 may be adapted to execute programming or executable code causing the modem processor 208 to measure/monitor one or more characteristics of the access terminal and adjust at least one operating parameter provided to the modem processor 208 in response to the one or more measured/monitored characteristics. By way of example and not limitation, the at least one operating parameter may include a voltage supplied to the modem processor 208, a clock frequency of the modem processor 208, or combination thereof. Such programming or executable code may be stored in a processor readable medium (e.g., in external memory device 204 or internal memory device 210) and may be referred to herein as a dynamic voltage and frequency scaling (DVFS) module 302. In at least one implementation, the modem processor 208 may be adapted to monitor a wireless wide area network (WWAN) protocol information, such as a WWAN protocol stack 308 implemented in a memory device, such as the internal memory device 210. In additional implementations, the modem processor 208 may be adapted to also monitor an activity rate of the modem processor 208 and/or an activity rate of the memory bus 212.

Figure 3:
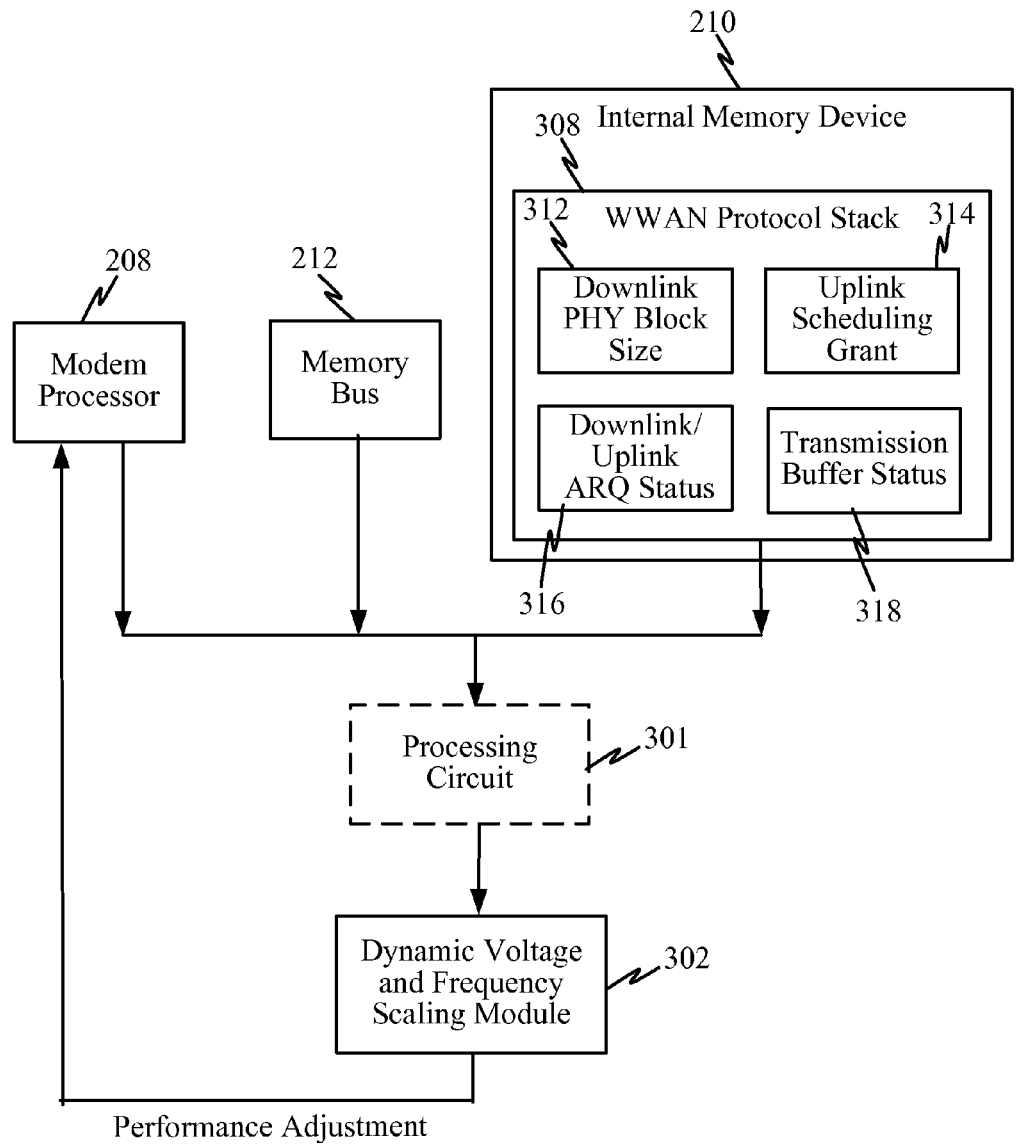
FIG. 3 is a block diagram illustrating a circuit or device adapted to facilitate processor performance level management.

FIG. 3 illustrates a block diagram of a circuit or device (e.g., in access terminal 200 of FIG. 2 and/or modem device 206) adapted to facilitate processor performance level management. As illustrated, a DVFS module 302 may be adapted to cause a processing circuit 301 to monitor WWAN protocol information, such as WWAN protocol stack 308. Note that the processing circuit 301 may be the modem processor 208 or other dedicated or multi-purpose processing circuit. In addition, the DVFS module 302 may be adapted to cause the same processing circuit 301 or a different processing circuit to monitor an activity rate of the modem processor 208 and/or an activity rate of the memory bus 212. Based on information obtained from the WWAN protocol stack 308, and optionally from the activity rate of the modem processor 208 and/or the activity rate of a memory bus 212, the DVFS module 302 may cause adjustment of the performance of the modem processor 208 upward, downward, or leave such resources unchanged. For example, the DVFS module 302 may cause adjustment (e.g., increase or decrease) of one or more operating parameters provided to the modem processor 208, such as a voltage supplied to the modem processor 208 and/or a clock frequency of the modem processor 208.

As noted above, the DVFS module 302 may optionally cause the processing circuit 301 (e.g., modem processor 208 or a separate processor) to monitor the activity rate of the modem processor 208. The activity rate of the modem processor 208 may include, for example, the percentage of clock cycles for the modem processor 208 that are idle. That is, as the modem processor 208 operates at a given frequency, the modem processor 208 may be active in processing a command or fetching data during some of the clock cycles and may be idle during other clock cycles. Upon monitoring the activity rate of the modem processor 208, the DVFS module 302 may determine what percentage of the clock cycles is idle. If the percentage of idle cycles is below some threshold, the DVFS module 302 may determine that an increase in processor performance would be beneficial. For example, the DVFS module 302 may cause the clock frequency of the modem processor 208 to be increased, the level of voltage supplied to the modem processor 208 to be increased, or a combination of frequency and voltage to be increased. On the other hand, if the percentage of idle cycles is above some threshold, the DVFS module 302 may cause the clock frequency and/or the voltage level to be decreased, resulting in increased power conservation.

Optionally, the processing circuit 301 (e.g., modem processor 208 or a separate processor) may also monitor the activity rate of the memory bus 212. The activity rate of the memory bus 212 may include the amount of read/write commands on the memory bus 212. That is, the number of packets that are being conveyed over the memory bus 212. Monitoring the activity rate of the memory bus 212 may also include monitoring the average time it takes for a read/write command to be executed. If read/write commands on the memory bus 212 are high and/or the average delay time to execute a read/write command is above some threshold, the DVFS module 302 may cause an increase in a performance level of the modem processor 208 (e.g., increased frequency, voltage or both).

As also noted, the DVFS module 302 is adapted to cause the processing circuit 301 (e.g., modem processor 208 or a separate processor) to monitor the WWAN protocol stack 308 implemented in a memory device, such as the internal memory device 210. That is, the DVFS module 302 may cause a processing circuit 301 to monitor one or more characteristics of a WWAN protocol stack 308. By way of example and not limitation, the DVFS module 302 may cause the processing circuit 301 to monitor a downlink physical transport block size 312, an uplink scheduling grant 314, a downlink and/or uplink automatic repeat request (ARQ) status 316, a transmission buffer status 318, or some combination thereof.

Adjusting Processor Performance Based on Downlink Information

According to one feature, processor performance may be adjusted based one on information for the downlink. For instance, the DVFS module 302 may cause the processing circuit 301 (e.g., modem processor 208 or a separate processor) to monitor a downlink physical transport block size 312. The downlink physical transport block size 312 generally comprises the number of bits of data accepted by the physical layer to be jointly encoded and transmitted to the access terminal. The transport block size 312 identifying the size of the transport block about to be received by the access terminal may be conveyed from an access node to the access terminal as a signaling/control message via a signaling/control channel. Such a signaling/control message including the transport block size 312 is typically sent and processed before the transport block itself is transmitted. For example, in HSPA, the access terminal may receive a transport block in as little as 1.2 milliseconds after receiving the indication of transport block size 312. Furthermore, in HSPA, the data channel carrying the transport block (e.g., the High-Speed Physical Downlink Shared Channel (HS-PDSCH)) may not be immediately processed, resulting in additional delay between the point in time when the indication of transport block size 312 is processed (e.g., the High Speed Shared Control CHannel (HS-SCCH)) and the point in time when the transport block is processed (e.g., the HS-PDSCH). The combination of such delays between the transport block size 312 and the transport block itself (e.g., delay between transmission and delay between processing) provides the DVFS module 302 sufficient time to react.

Accordingly, the DVFS module 302 may cause a processing circuit to monitor the WWAN protocol stack 308 for signaling/control messages sent via a signaling/control channel from an access node indicating the size of an imminent transport block. When the DVFS module 302 has received a signaling/control message containing information indicating the transport block size from a signaling/control channel, the DVFS module 302 may adjust the performance of the modem processor 208 to a performance level capable of processing the transport block data without risking the loss of data (e.g., data being overwritten in a buffer of limited storage capacity (internal memory device 210 of FIG. 2) if it is not transferred from the buffer to another storage medium of larger storage capacity (e.g., external memory device 204 of FIG. 2)).

According to at least one feature, the DVFS module 302 may utilize the transport block size 312 to estimate or predict a desirable processor performance level that will be sufficient for processing the up-coming transport block data if the transport block is decoded correctly. For instance, the size of the physical transport block may have a determinable (or calculable) relationship or effect on the expected processor requirements. By way of example and not limitation, it has been discovered that, for at least some implementations, the size of the physical transport block has a substantially deterministic (e.g., linear) relationship or effect on the expected processor requirements. That is, as the size of the physical transport block increases or decreases, the processor resources that may be needed to properly process the expected transport block data increases or decreases proportional to the increase or decrease in transport block size. Because of such a determinable relationship, the DVFS module 302 may be able to calculate the specific processor performance level capable of processing transport block data of a given transport block size prior to receiving the transport block. As a result, the DVFS module 302 may adjust the performance level of the modem processor 208 (e.g., the operating parameter provided to the modem processor 208) in anticipation of an increased or decreased use of processor resources.

Adjusting Processor Performance Based on Uplink Information

According to one feature, processor performance may also be adjusted based one on information for the uplink. For instance, the DVFS module 302 may cause the processing circuit 301 (e.g., modem processor 208 or a separate processor) to monitor an uplink scheduling grant 314. Similar to the downlink physical transport block size 312, the performance level of the modem processor 208 for an uplink transmission can also be closely predicted by an uplink scheduling grant 314. The uplink scheduling grant 314 generally comprises an uplink transmission block size allocated to the access terminal by the communication network. The uplink scheduling grant 314 may be conveyed to an access terminal from an access node as a signaling/control message via a signaling/control channel.

Accordingly, the DVFS module 302 may cause the processing circuit 301 to monitor the WWAN protocol stack 308 for signaling/control messages sent via a signaling/control channel from an access node comprising an uplink scheduling grant 314. Although the access terminal may not transmit a data block large enough to use all of the allocated bandwidth identified by the uplink scheduling grant 314, the DVFS module 302 may use the uplink scheduling grant 314 to plan processor resources for a worst-case scenario. That is, the DVFS module 302 may use the information from the uplink scheduling grant 314 identifying a maximum allocated transmission block size to adjust the performance of the modem processor 208 to a level capable of sufficiently processing the data within a given transmission time interval if the maximum transmission block size is utilized by the access terminal.

Similar to the downlink physical transport block size discussed above, the block size indicated by the uplink scheduling grant 314 has a determinable relationship to the processor requirements. For example, in some implementations it has been observed that the block size indicated by the uplink scheduling grant 314 has a substantially deterministic (e.g., linear) relationship to the processor requirements. That is, as the block size allocated by the uplink scheduling grant 314 increases or decreases, the processor resources that may be needed to properly process the transport block data increases or decreases proportionally. Because of this determinable relationship, the DVFS module 302 may be able to use the information from the uplink scheduling grant 314 to calculate a sufficient performance level for the modem processor 208 prior to an actual increase or decrease in the use of processor resources. As a result, the DVFS module 302 may adjust the modem processor performance level in anticipation of an increased or decreased use of processor resources.

Adjusting Processor Performance Based on ARQ Outstanding Window

According to yet another feature, the DVFS module 302 may cause the processing circuit 301 (e.g., modem processor 208 or a separate processor) to monitor an uplink and/or downlink automatic repeat request (ARQ) status 316. The ARQ protocol is commonly deployed in the radio link control layer of the WWAN protocol stack, on both uplink and downlink transmission. When a particular packet is lost during transmission, subsequent packets arrive out of sequence. The receiving device typically accumulates all the out of sequence packets and waits for a successful retransmission of the lost packet. When retransmission is successful, the receiving device may reassemble all the accumulated packets and may transfer the reassembled packets to upper layers of the protocol stack. Typically, such reassembly and transfer to upper layers may result in a spike in processor resources used to process all the packets. If processor resources are not sufficient, the access terminal may experience an increase in latency and the user experience may be degraded.

In at least one implementation, the DVFS module 302 may monitor the ARQ status 316 by causing a processor to monitor a current outstanding window size. That is, the DVFS module 302 may determine the amount of out-of-sequence data that has been accumulated and that will be reassembled when the lost data packet is successfully retransmitted. As the outstanding window size grows, the DVFS module 302 may cause the modem processor performance level to be increased in order to enable the modem processor 208 to sufficiently process the data without substantial delay when the out-of-sequence data packet is received. As a result, the DVFS module 302 may adjust the performance level of the modem processor 208 in anticipation of an increased use of processor resources.

Adjusting Processor Performance Based on Transmission Buffer Status

According to at least one feature, the DVFS module 302 may cause the processing circuit 301 (e.g., modem processor 208 or a separate processor) to monitor a transmission buffer status 318. The transmission buffer status 318 typically includes information reported by the access terminal to the network via a signaling/control channel regarding the quantity of data that is waiting in the access terminal for uplink transmission. In HSPA, such a transmission buffer status is conventionally referred to as "scheduling information" (SI), while in LTE, such a transmission buffer status is conventionally referred to as a "buffer status report" (BSR). The network may use the transmission buffer status 318, along with other factors, in determining the uplink transmission block size allocated to the access terminal and communicated to the access terminal by the uplink scheduling grant.

Accordingly, the DVFS module 302 may cause a processing circuit to monitor the WWAN protocol stack 308 for signaling/control messages sent via a signaling/control channel from the access terminal comprising a transmission buffer status 318. The DVFS module 302 may use the transmission buffer status 318 to plan processor resources for a worst-case scenario. That is, the DVFS module 302 may use the information from the transmission buffer status 318 to adjust the performance level of the modem processor 208 to a level capable of sufficiently transmitting the data within a given transmission time interval if the network grants the access terminal a block size sufficient to transmit the entire quantity of data identified by the transmission buffer status 318.

As noted above in relation to the downlink physical transport block size 312 and the uplink scheduling grant 314, the quantity of data transmitted by an access terminal to an access node for a given block size has a determinable relationship to the processor resources desired to sufficiently process the data. In some implementations, it has been observed that the quantity of data transmitted by an access terminal to an access node for a given block size has a substantially deterministic (e.g., linear) relationship to the processor resources desired to sufficiently process the data. Because of this determinable relationship, the DVFS module 302 may be able to employ the information from the transmission buffer status 318 to ascertain a sufficient performance level for the modem processor 208 prior to an actual increase/decrease in the use of processor resources. As a result, the DVFS module 302 may adjust the modem processor performance level in anticipation of an increased/decreased use of processor resources.

According to at least one feature, and as noted above, at least some of the information of the WWAN protocol stack 308 monitored by the DVFS module 302 may be obtained by monitoring messages sent and received via a signaling/control channel. Accordingly, the DVFS module 302 may cause a processor to monitor a signaling/control channel to obtain signaling/control messages comprising particular information relating to the WWAN protocol stack 308.

According to one or more features, various implementations may enable improved power conservation. In particular, the information obtained by monitoring the WWAN protocol stack 308 may be accurate in terms of predicting both the processor resource requirements and the timing for such processor resource requirements. For example, the information obtained from the WWAN protocol stack 308 may indicate how much processing resources may be needed (e.g., the transport block size 312 has a determinable relationship to required processing resources), and may indicate when the predicted resources will be needed (e.g., the transport block size 312 is associated with a transport block that will be sent during a subsequent downlink transmission time interval). Because the information obtained from monitoring the WWAN protocol stack 308 may enable the DVFS module 302 to predict processor resource requirements before such processor resources are needed, the DVFS may be more responsive in adjusting processor resources and, as a result, may be able to operate the processor resources at a lower level during periods of low activity. That is, because the DVFS module 302 is able to react more quickly to demands for increased processor resources, the DVFS module 302 is able to operate the processor resources during periods of relatively low activity at lower levels than a conventional scaling module would be able to achieve without risking loss of data and missed transmission deadlines. As a result, power conservation may be significantly optimized.

In the implementations described above, the DVFS module 302 is described as being adapted to cause the modem processor 208 to monitor the activity rate of the modem processor 208, the activity rate of a memory bus 212, and the WWAN protocol stack 308. However, it is noted that in other implementations the DVFS module 302 may be adapted to cause another processing circuit (e.g., processing circuit 202 of FIG. 2) distinct from the modem processor 208 to monitor the activity rate of the modem processor 208, the activity rate of a memory bus 212, and the WWAN protocol stack 308.

Figure 4:
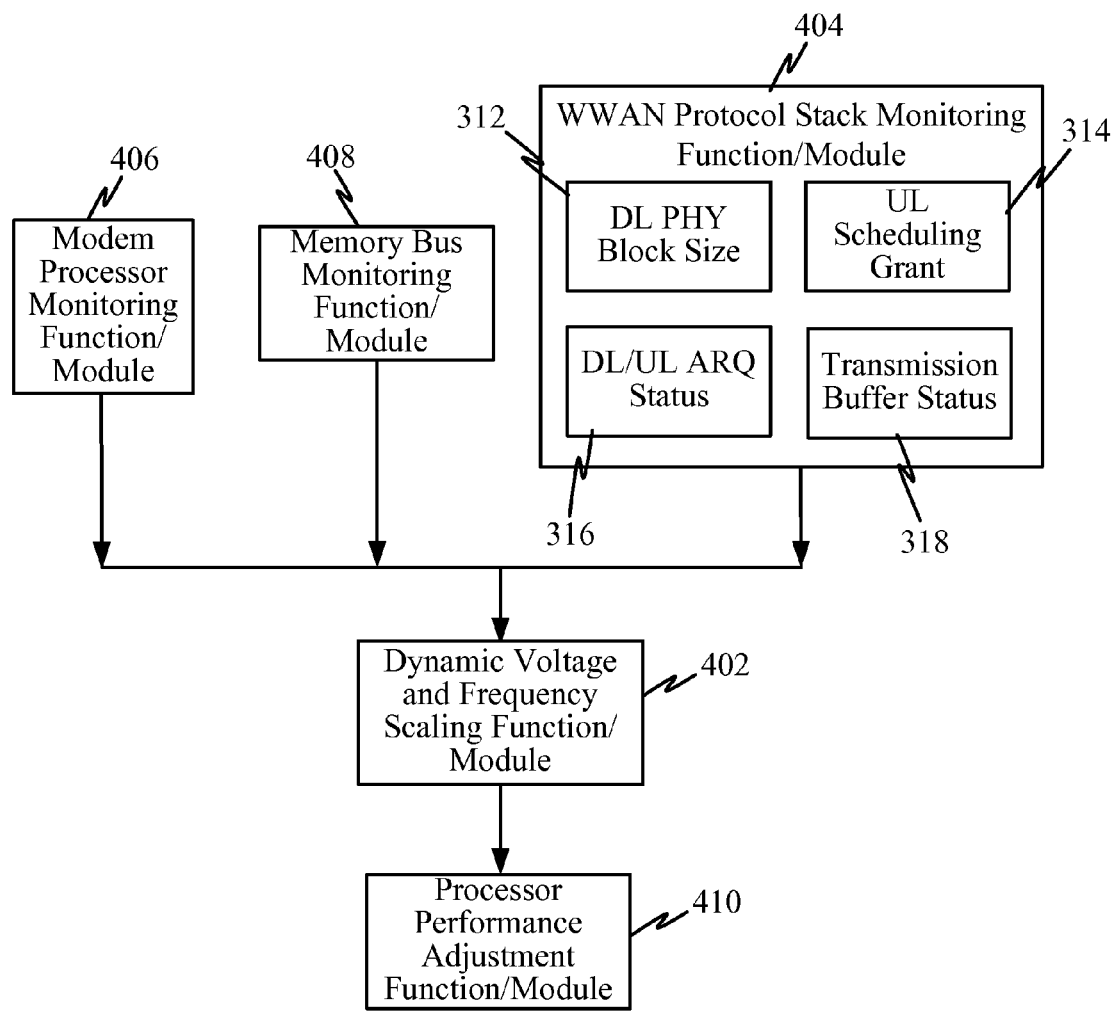
FIG. 4 is a block diagram illustrating at least some functional features of a circuit or device for facilitating processor performance level management.

FIG. 4 is a block diagram illustrating at least some functional features of an access terminal for facilitating processor performance level management. Some or all of these functions illustrated herein may be performed by one or more processor circuits or modules, as noted below. As noted above, an access terminal and/or modem device (e.g., communication circuit) may be adapted to perform various functions to dynamically adjust the operation of a communication circuit (e.g., a modem processor).

A WWAN protocol stack monitoring function 404 may be adapted to monitor the WWAN protocol stack and to provide information relating to the WWAN protocol stack. For example, the WWAN protocol stack monitoring function 404 may be adapted to monitor the downlink physical transport block size 312, the uplink scheduling grant 314, the downlink and/or uplink automatic repeat request (ARQ) status 316, the transmission buffer status 318, or some combination thereof. The WWAN protocol stack monitoring function 404 may employ a WWAN protocol stack monitoring module adapted to perform the various functions of the WWAN protocol stack monitoring function 404.

Additionally, a processor monitoring function 406 may be optionally adapted to measure an activity rate of a processor (e.g., such as the modem processor 208 of FIGS. 2 and 3). The processor monitoring function 406 may employ a processor monitoring module for carrying out such functions.

A memory bus monitoring function 408 may be optionally provided to measure an activity rate of a memory bus. The memory bus monitoring function 408 may provide information regarding the activity rate of the memory bus to the DVFS module 402. Such functions may be implemented by employing a memory bus monitoring module.

The dynamic voltage and frequency scaling function 402 may use the information obtained from the WWAN protocol stack monitoring function 404, the processor monitoring function 406 and/or the memory bus monitoring function 408 to determine whether to adjust the processor performance. If the dynamic voltage and frequency scaling function 402 determines that the processor should be adjusted, a processor performance adjustment function 410 may then adjust the processor. The processor performance adjustment function 410 may employ a processor performance adjustment module to adjust one or more of the operating parameters provided to the processor.

Figure 5:
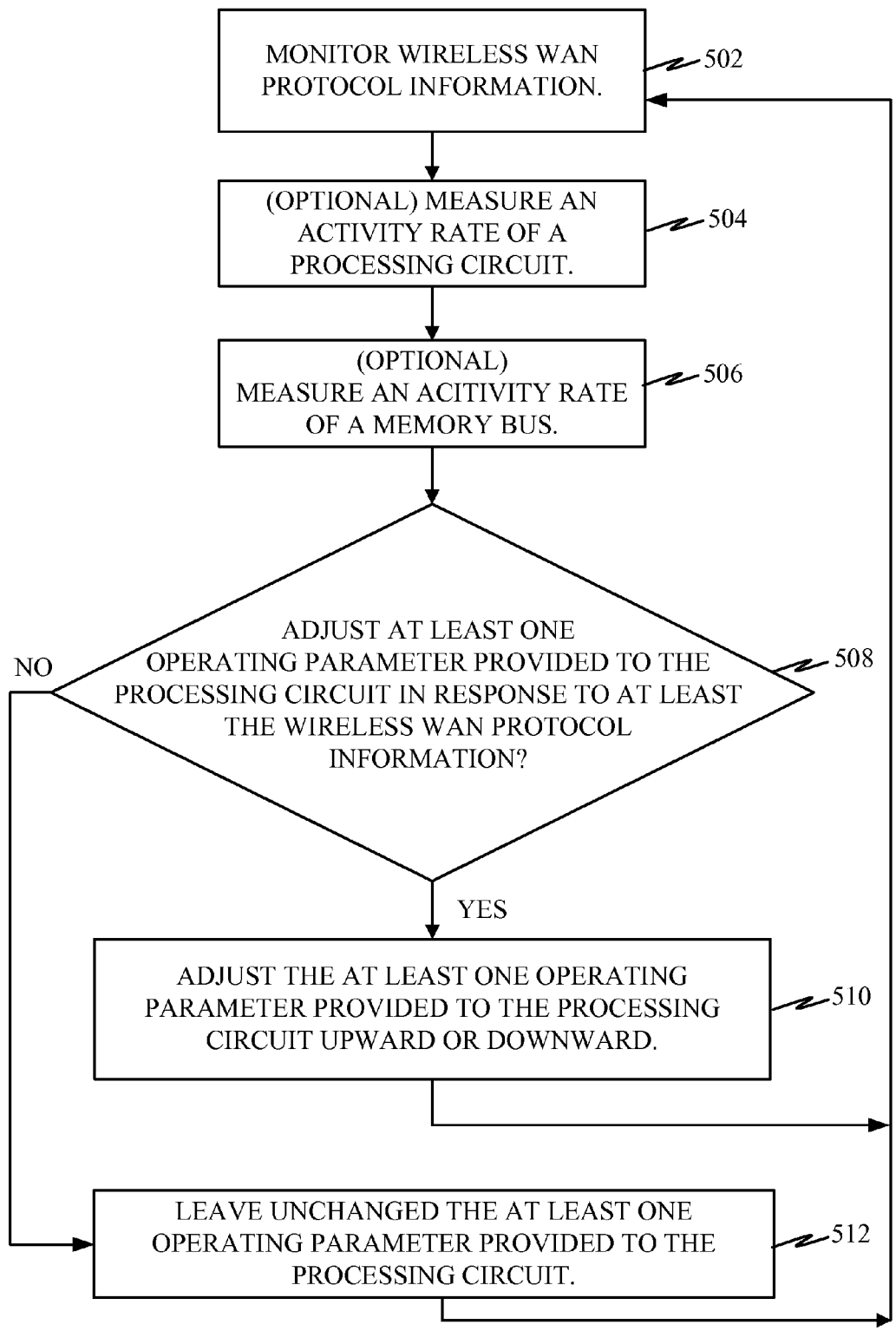
FIG. 5 illustrates a flow diagram illustrating a method operational in a modem device operable in an access terminal for facilitating processor performance level management.

Exemplary Methods for Adjusting Processor Performance Based on WWAN Protocol Information Turning to FIG. 5, a flow diagram is shown illustrating a method operational in a modem device operable in an access terminal for facilitating processor performance level management. The method may include monitoring WWAN protocol information 502. For example, the WWAN protocol stack may be monitored. According to one or more optional features, the method may also include measuring an activity rate of a processing circuit 504 and/or measuring an activity rate of a memory bus 506. In response to at least the monitored WWAN protocol information, as well as the activity rate of the processing circuit and/or the activity of the memory bus, if also monitored, it may be determined whether to adjust at least one operating parameter provided to the processing circuit 508. The at least one operating parameter may include a voltage supplied to the processing circuit and/or a clock frequency of the processing circuit. If it is determined to adjust the at least one operating parameter provided to the processing circuit, then the modem device may make the appropriate adjustment to the one or more operating parameters 510. For example, the modem device may adjust upward or downward the voltage supplied to the processing circuit and/or the clock frequency of the processing circuit. On the other hand, if it is determined that no adjustments are desired, then the at least one operating parameter (e.g., voltage and/or clock frequency) may be left unchanged 512. After steps 510 or 512, the method may be repeated by again monitoring the WWAN protocol information at step 502.

Measuring an activity rate of the processing circuit 504 may include measuring the percentage of clock cycles for the processing circuit that are idle. That is, as the processing circuit operates at a given frequency, the processing circuit will be active in processing a command or fetching data during some of the clock cycles and will be idle during other clock cycles. Monitoring the activity rate of the processing circuit may, therefore, include determining what percentage of the clock cycles is idle. If the percentage of idle cycles is below some threshold, an increase in processor performance (e.g., increase in voltage and/or frequency) may be beneficial. On the other hand, if the percentage of idle cycles is above some threshold, a decrease in processor performance (e.g., reduction in voltage and/or frequency) may be beneficial.

Measuring an activity rate of the memory bus 506 may include measuring the amount of read/write commands on the memory bus. That is, the number of packets that are being conveyed over the memory bus. Additionally/alternatively, measuring the activity rate of the memory bus may include measuring the average time it takes for a read/write command to be executed. If the quantity of read/write commands on the memory bus is high and/or the average delay time to execute a read/write command is above some threshold, an increase in processor performance (e.g., increase in voltage and/or frequency) may be beneficial.

Monitoring the WWAN protocol information 502 may include monitoring one or more characteristics of the WWAN protocol stack. By way of example and not limitation, monitoring the WWAN protocol stack may include monitoring a downlink physical transport block size, an uplink scheduling grant, a downlink and/or uplink automatic repeat request (ARQ) status, or a transmission buffer status, as well as some combination thereof. FIGS. 6-9 show example flow diagrams illustrating adjustment of processor performance level based on information from the WWAN protocol information. It will be appreciated that the particular performance level management techniques shown and described are by way of example and not limitations.

Figure 6:
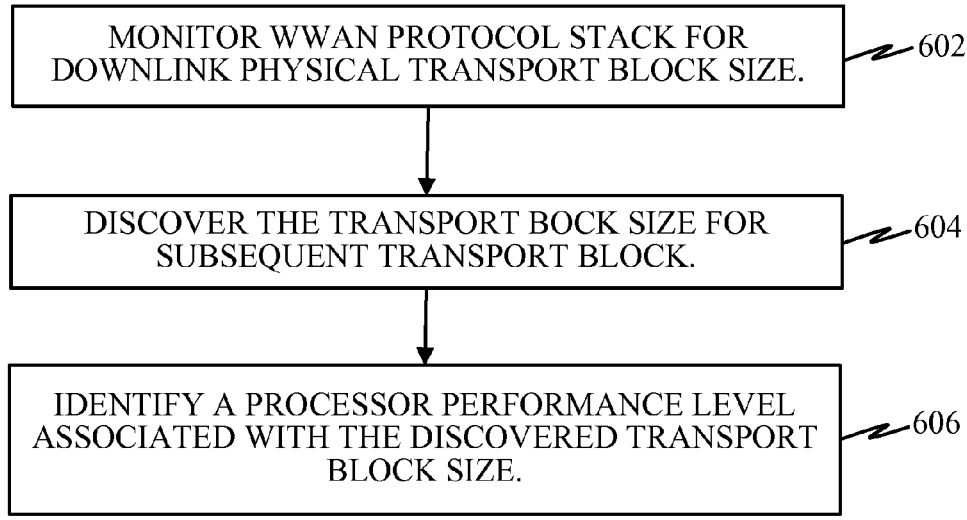
FIG. 6 illustrates a flow diagram depicting a method operational in a modem device operable in an access terminal for monitoring the WWAN protocol stack for a downlink physical transport block size.

FIG. 6 illustrates a flow diagram depicting a method operational in a modem device operable in an access terminal for monitoring the WWAN protocol information. As depicted, monitoring the WWAN protocol information may include monitoring the WWAN protocol stack for a downlink physical transport block size 602. In at least some implementations, monitoring for a downlink physical transport block size may include monitoring a signaling/control channel for a signaling/control message including information indicating the transport block size. Upon identifying such a signaling/control message, the transport block size for the subsequent transport block may be discovered (e.g., from the information contained in the signaling/control message) 604. After learning the transport block size for an imminent transport block, a processor performance level associated with the discovered transport block size may be identified 606. As previously discussed, the size of the physical transport block may have a determinable relationship to a desired processor performance level. For example, the size of the physical transport block may have a substantially deterministic (e.g., linear) relationship such that, as the size of the physical transport block increases/decreases, the desired processor performance level to properly process the transport block data increases/decreases proportional to the increase/decrease in transport block size.

Figure 7:
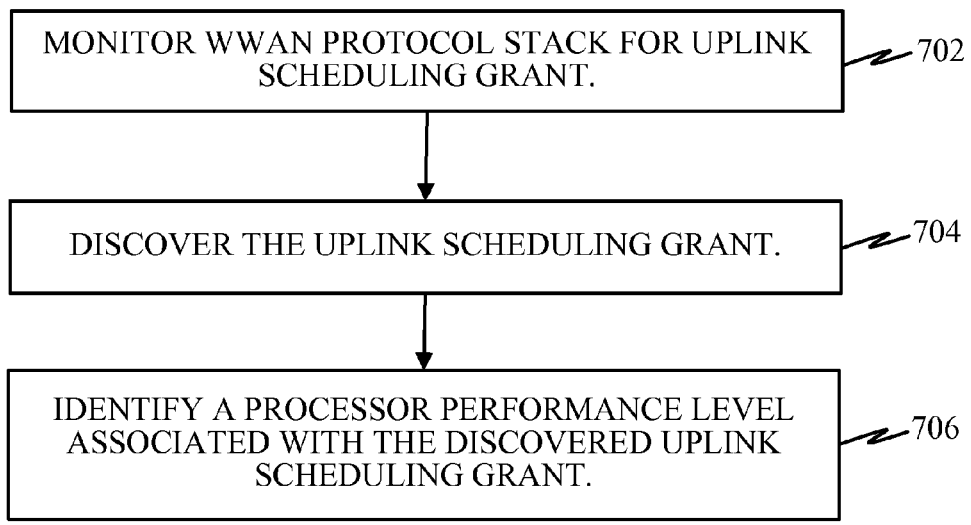
FIG. 7 illustrates a flow diagram depicting a method operational in a modem device operable in an access terminal for monitoring the WWAN protocol stack for an uplink scheduling grant.

FIG. 7 illustrates a flow diagram depicting a method operational in a modem device operable in an access terminal for monitoring the WWAN protocol information. As depicted, monitoring the WWAN protocol information may include monitoring the WWAN protocol stack for an uplink scheduling grant 702. In some implementations, monitoring the WWAN protocol stack for an uplink scheduling grant may include monitoring a signaling/control channel for a signaling/control message including information indicating the uplink scheduling grant. As noted above, the uplink scheduling grant generally comprises an uplink transmission block size allocated to the access terminal by the communication network. Upon identifying a signaling/control message including the uplink scheduling grant, the uplink scheduling grant may be discovered (e.g., from the information contained in the signaling/control message) 704. The information from the uplink scheduling grant identifying a maximum allocated transmission block size may be used to adjust the processor performance to a level capable of sufficiently processing the data within a given transmission time interval if the maximum transmission block size is utilized by the access terminal. The uplink scheduling grant may accordingly be employed to identify an associated processor performance level 706. For example, the block size indicated by the uplink scheduling grant has a determinable relationship to the processor requirements, enabling a processor performance level to be predicted for any given block size. In at least one implementation, the block size indicated by the uplink scheduling grant may have a substantially deterministic (e.g., linear) relationship to the processor requirements.

Figure 8:
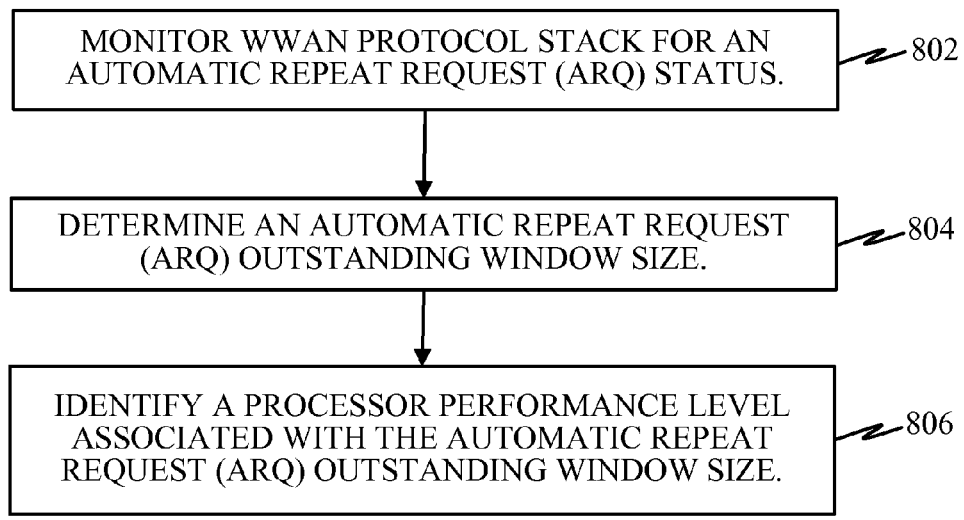
FIG. 8 illustrates a flow diagram depicting a method operation in a modem device operable in an access terminal for monitoring the WWAN protocol stack for an automatic repeat request (ARQ) status.

FIG. 8 illustrates a flow diagram depicting a method operational in a modem device operable in an access terminal for monitoring the WWAN protocol information. As depicted, monitoring the WWAN protocol information may include monitoring the WWAN protocol stack for an automatic repeat request (ARQ) status 802. In some implementations, monitoring the WWAN protocol stack for an ARQ status may include determining a current ARQ outstanding window size 804. That is, the amount of out-of-sequence data that has been accumulated and that will be reassembled when the lost data packet is successfully retransmitted may be determined. A processor performance level associated with the ARQ outstanding window size may be identified 806. For example, as the outstanding window size grows, the desired processor performance level may increase to enable the processing circuit to sufficiently process the data without substantial delay when the out-of-sequence data packet is received. As a result, the processor performance level may be increased in anticipation of an increased use of processor resources.

Figure 9:
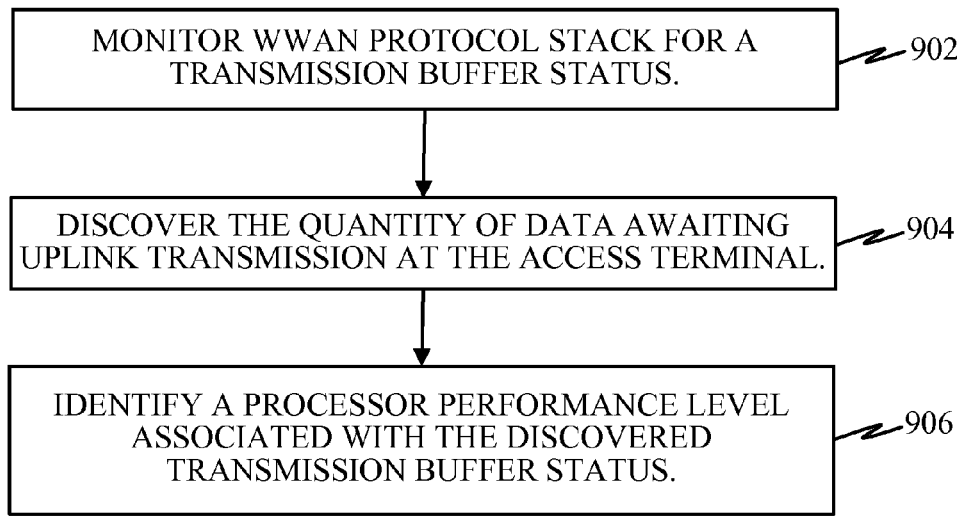
FIG. 9 illustrates a flow diagram depicting a method operation in a modem device operable in an access terminal for monitoring the WWAN protocol stack for a transmission buffer status.

FIG. 9 illustrates a flow diagram depicting a method operational in a modem device operable in an access terminal for monitoring the WWAN protocol information. As depicted, monitoring the WWAN protocol information may include monitoring the WWAN protocol stack for a transmission buffer status 902. In some implementations, monitoring the WWAN protocol stack for a transmission buffer status may include monitoring a signaling/control channel for a signaling/control message originating at the access terminal that includes information indicating the transmission buffer status. As noted above, the transmission buffer status typically includes information regarding the quantity of data that is waiting at the access terminal for uplink transmission. Therefore, upon identifying a signaling/control message including a transmission buffer status, the information relating to the quantity of data waiting at the access terminal for uplink transmission may be discovered 904. The transmission buffer status may be employed to identify a processor performance level capable of sufficiently transmitting the data identified by the transmission buffer status within a given transmission time interval if the network grants the access terminal a block size sufficient to transmit the entire quantity of data 906. For example, the transmission buffer status may have a determinable relationship to the processor requirements, enabling a processor performance level to be predicted for any given transmission buffer status. In at least one implementation, it was observed that the transmission buffer status may have a substantially deterministic (e.g., linear) relationship to the processor requirements.

One or more of the components, steps, features and/or functions illustrated in FIGS. 1, 2, 3, 4, 5, 6, 7, 8 and/or 9 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, and/or 3 may be configured to perform one or more of the methods, features, or steps described in FIGS. 4, 5, 6, 7, 8 and/or 9. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a non-transitory machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to portable or fixed storage devices, optical storage devices, and various other mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A modem device operable in an access terminal, comprising:
   a wireless communication interface;
   a memory device adapted to implement a wireless wide area network (WWAN) protocol stack for the wireless communication interface; and
   a processing circuit communicatively coupled to the wireless communication interface and the memory device, the processing circuit adapted to:
   monitor wireless wide area network (WWAN) protocol information from the wireless wide area network (WWAN) protocol stack;
   determine whether to adjust at least one hardware operating parameter provided to the processing circuit based on the monitored wireless wide area network (WWAN) protocol information, including predicting whether to adjust the at least one hardware operating parameter provided to the processing circuit in anticipation of an increase in use of processing circuit resources; and
   adjust the at least one hardware operating parameter provided to the processing circuit in response to the monitored wireless wide area network (WWAN) protocol information to control the physical operation of the processing circuit.

2. The modem device of claim 1, wherein the processing circuit comprises a modem processor.

3. The modem device of claim 1, wherein the processing circuit is further adapted to:
   measure an activity rate of at least one of the processing circuit or a memory bus coupled to the memory device; and
   adjust the at least one hardware operating parameter provided to the processing circuit in response to the activity rate of the at least one of the processing circuit or the memory bus in addition to the wireless wide area network (WWAN) protocol information.

4. The modem device of claim 3, wherein the processing circuit is adapted to measure the activity rate of the processing circuit by measuring a percentage of idle clock cycles for the processing circuit.

5. The modem device of claim 3, wherein the processing circuit is adapted to measure the activity rate of the memory bus by measuring an amount of read/write commands on the memory bus and an average delay time to execute the read/write commands.

6. The modem device of claim 1, wherein the processing circuit is adapted to monitor the wireless wide area network (WWAN) protocol information by monitoring at least one of downlink physical transport block size, an uplink scheduling grant, an automatic repeat request (ARQ) window size, or a transmission buffer status.

7. The modem device of claim 1, wherein the processing circuit is adapted to monitor the wireless wide area network (WWAN) protocol information by monitoring a signaling/control channel for one or more signaling/control messages conveyed between the modem device and an access node.

8. The modem device of claim 1, wherein adjusting the at least one hardware operating parameter provided to the processing circuit includes adjusting at least one of a voltage supplied to the processing circuit or a clock frequency of the processing circuit.

9. The modem device of claim 8, wherein the processing circuit is adapted to increase the voltage supplied to the processing circuit when the clock frequency of the processing circuit is increased.

10. The modem device of claim 8, wherein the processing circuit is adapted to decrease the clock frequency of the processing circuit when the voltage supplied to the processing circuit is decreased.

11. A method operational in a modem device for managing a performance level of a processing circuit, the method comprising:
monitoring wireless wide area network (WWAN) protocol information from a wireless wide area network (WWAN) protocol stack;
determining whether to adjust at least one hardware operating parameter provided to the processing circuit based on the monitored wireless wide area network (WWAN) protocol information, including predicting whether to adjust the at least one hardware operating parameter provided to the processing circuit in anticipation of an increase in use of processing circuit resources; and
adjusting the at least one hardware operating parameter provided to the processing circuit in response to the monitored wireless wide area network (WWAN) protocol information to control the physical operation of the processing circuit.

12. The method of claim 11, further comprising:
measuring an activity rate of at least one of a processing circuit or a memory bus; and
adjusting the at least one hardware operating parameter provided to the processing circuit in response to the at least one of the activity rate of the at least one of the processing circuit or the memory bus, in addition to the wireless wide area network (WWAN) protocol information.

13. The method of claim 12, wherein measuring the activity rate of the processing circuit comprises measuring a percentage of idle clock cycles for the processing circuit.

14. The method of claim 12, wherein measuring the activity rate of the memory bus comprises measuring a quantity of read/write commands on the memory bus and an average delay time to execute the read/write commands.

15. The method of claim 11, wherein monitoring the wireless wide area network (WWAN) protocol information includes monitoring at least one of a downlink physical transport block size, an uplink scheduling grant, an automatic repeat request (ARQ) window size, or a transmission buffer status.

16. The method of claim 15, wherein monitoring the wireless wide area network (WWAN) protocol information includes:
monitoring the wireless wide area network (WWAN) protocol information for a downlink physical transport block size;
discovering the downlink physical transport block size; and
identifying a processing circuit performance level associated with the discovered downlink physical transport block size.

17. The method of claim 15, wherein monitoring the wireless wide area network (WWAN) protocol information includes:
monitoring wireless wide area network (WWAN) protocol information for an uplink scheduling grant;
discovering the uplink scheduling grant; and
identifying a processing circuit performance level associated with the discovered uplink scheduling grant.

18. The method of claim 15, wherein monitoring the wireless wide area network (WWAN) protocol information includes:
monitoring the wireless wide area network (WWAN) protocol information for an automatic repeat request (ARQ) status;
determining an automatic repeat request (ARQ) outstanding window size; and
identifying a processing circuit performance level associated with the automatic repeat request (ARQ) outstanding window size.

19. The method of claim 15, wherein monitoring the wireless wide area network (WWAN) protocol information includes:
monitoring the wireless wide area network (WWAN) protocol information for a transmission buffer status;
discovering the transmission buffer status; and
identifying a processing circuit performance level associated with the discovered transmission buffer status.

20. The method of claim 11, wherein monitoring the wireless wide area network (WWAN) protocol information includes monitoring a signaling/control channel for one or more signaling/control messages conveyed between the modem device and an access node.

21. The method of claim 11, wherein adjusting the at least one hardware operating parameter provided to the processing circuit comprises adjusting upward or downward at least one of a voltage supplied to the processing circuit or a clock frequency of the processing circuit.

22. The method of claim 21, further comprising increasing the voltage supplied to the processing circuit when the clock frequency of the processing circuit is increased.

23. The method of claim 21, further comprising decreasing the clock frequency of the processing circuit when the voltage supplied to the processing circuit is decreased.

24. A modem device operable in a wireless terminal, comprising:
means for at least one of transmitting or receiving wireless communications;
means for monitoring wireless wide area network (WWAN) protocol information from a wireless wide area network (WWAN) protocol stack;
means for determining whether to adjust at least one hardware operating parameter provided to the processing circuit based on the monitored wireless wide area network (WWAN) protocol information, including means for predicting whether to adjust the at least one hardware operating parameter provided to the processing circuit in anticipation of an increase in use of processing circuit resources; and means for adjusting the at least one hardware operating parameter provided to a processing circuit in response to the monitored wireless wide area network (WWAN) protocol information to control the physical operation of the processing circuit.

25. The modem device of claim 24, wherein the processing circuit comprises a modem processor.

26. The modem device of claim 24, further comprising:
means for measuring an activity rate of at least one of the processing circuit or a memory bus; and
means for adjusting the at least one hardware operating parameter provided to the processing circuit in response to the activity rate of the at least one of the processing circuit or the memory bus, in addition to the monitored wireless wide area network (WWAN) protocol information.

27. The modem device of claim 26, further comprising means for measuring a percentage of idle clock cycles for the processing circuit when measuring the activity rate of the processing circuit.

28. The modem device of claim 26, further comprising means for measuring a quantity of read/write commands on the memory bus and an average delay time to execute the read/write commands when measuring the activity rate of the memory bus comprises.

29. The modem device of claim 24, further comprising:
means for monitoring at least one of a downlink physical transport block size, an uplink scheduling grant, an automatic repeat request (ARQ) window size, or a transmission buffer status when monitoring the wireless wide area network (WWAN) protocol information; and
means for adjusting at least one hardware operating parameter provided to the processing circuit in response to (a) the monitored wireless wide area network (WWAN) protocol information and (b) at least one of the downlink physical transport block size, the uplink scheduling grant, the automatic repeat request (ARQ) window size, or the transmission buffer status to control the physical operation of the processing circuit.

30. The modem device of claim 24, further comprising means for monitoring a signaling/control channel for one or more signaling/control messages conveyed between the modem device and an access node when monitoring the wireless wide area network (WWAN) protocol information.

31. The modem device of claim 24, further comprising means for adjusting upward or downward at least one of a voltage supplied to the processing circuit or a clock frequency of the processing circuit.

32. A non-transitory processor-readable medium comprising one or more instructions operational on a modem device for managing a processor performance level, which when executed by a processor, causes the processor to:
monitor wireless wide area network (WWAN) protocol information from a wireless wide area network (WWAN) protocol stack;
determine whether to adjust at least one hardware operating parameter provided to the processing circuit in response to the wireless wide area network (WWAN) protocol information, including predicting whether to adjust the at least one hardware operating parameter provided to the processing circuit in anticipation of an increase in use of processor resources; and
adjust the at least one hardware operating parameter provided to a processing circuit in response to the monitored wireless wide area network (WWAN) protocol information to control the physical operation of the processing circuit.

33. The processor-readable medium of claim 32, wherein the processing circuit comprises a modem processor.

34. The processor-readable medium of claim 32, further comprising one or more instructions operational on the modem device, which when executed by the processor, causes the processor to:
measure an activity rate of at least one of a processing circuit or a memory bus; and
adjust the at least one hardware operating parameter provided to the processing circuit in response to the activity rate of the at least one of the processing circuit or the memory bus, in addition to the wireless wide area network (WWAN) protocol information.

35. The processor-readable medium of claim 34, wherein the one or more instructions operational on the modem device, which causes the processor to measure the activity rate of the processing circuit comprises one or more instructions operational on the modem device, which causes the processor to measure a percentage of idle clock cycles for the processing circuit.

36. The processor-readable medium of claim 34, wherein the one or more instructions operational on the modem device, which causes the processor to measure the activity rate of the memory bus comprises one or more instructions operational on the modem device, which causes the processor to measure an amount of read/write commands on the memory bus and an average delay time to execute the read/write commands.

37. The processor-readable medium of claim 32, wherein the one or more instructions operational on the modem device, which causes the processor to monitor the wireless wide area network (WWAN) protocol information comprises one or more instructions operational on the modem device, which causes the processor to:
monitor at least one of a downlink physical transport block size, an uplink scheduling grant, an automatic repeat request (ARQ) window size, or a transmission buffer status; and
adjust at least one hardware operating parameter provided to the processing circuit in response to (a) the monitored wireless wide area network (WWAN) protocol information and (b) at least one of the downlink physical transport block size, the uplink scheduling grant, the automatic repeat request (ARQ) window size, or the transmission buffer status to control the physical operation of the processing circuit.

38. The processor-readable medium of claim 34, wherein the one or more instructions operational on the modem device, which causes the processor to monitor the wireless wide area network (WWAN) protocol information comprises one or more instructions operational on the modem device, which causes the processor to monitor a signaling/control channel for one or more signaling/control messages conveyed between the modem device and an access node.

39. The processor-readable medium of claim 34, wherein the one or more instructions operational on the modem device, which causes the processor to adjust the at least one operating parameter comprises one or more instructions operational on the modem device, which causes the processor to adjust upward or downward at least one of a voltage supplied to the processing circuit or a clock frequency of the processing circuit.

40. A modem device operable in an access terminal, comprising:
a wireless communication interface;
a memory device adapted to implement a wireless wide area network (WWAN) protocol stack for the wireless communication interface; and
a processing circuit communicatively coupled to the wireless communication interface and the memory device, the processing circuit adapted to:
monitor wireless wide area network (WWAN) protocol information from the wireless wide area network (WWAN) protocol stack;
measure an activity rate of a memory bus coupled to the memory device by measuring an amount of read/write commands on the memory bus and an average delay time to execute the read/write commands; and
adjust at least one hardware operating parameter provided to the processing circuit in response to (a) the monitored wireless wide area network (WWAN) protocol information and (b) the activity rate of the memory bus to control the physical operation of the processing circuit.

41. A method operational in a modem device for managing a performance level of a processing circuit, the method comprising:
monitoring wireless wide area network (WWAN) protocol information from a wireless wide area network (WWAN) protocol stack;
measuring an activity rate of a memory bus coupled to the modem device by measuring a quantity of read/write commands on the memory bus and an average delay time to execute the read/write commands; and
adjusting at least one hardware operating parameter provided to the processing circuit in response to (a) the monitored wireless wide area network (WWAN) protocol information and (b) the activity rate of the memory bus to control the physical operation of the processing circuit.

42. A modem device operable in a wireless terminal, comprising:
means for at least one of transmitting or receiving wireless communications;
means for monitoring wireless wide area network (WWAN) protocol information from a wireless wide area network (WWAN) protocol stack;
means for measuring an activity rate of a memory bus coupled to the modem device by measuring a quantity of read/write commands on the memory bus and an average delay time to execute the read/write commands; and
means for adjusting at least one hardware operating parameter provided to a processing circuit in response to (a) the monitored wireless wide area network (WWAN) protocol information and (b) the activity rate of the memory bus to control the physical operation of the processing circuit.

43. A non-transitory processor-readable medium comprising one or more instructions operational on a modem device for managing a processor performance level, which when executed by a processor, causes the processor to:
monitor wireless wide area network (WWAN) protocol information from a wireless wide area network (WWAN) protocol stack;
measure an activity rate of a memory bus coupled to the modem device by measuring an amount of read/write commands on the memory bus and an average delay time to execute the read/write commands; and
adjust at least one hardware operating parameter provided to a processing circuit in response to (a) the monitored wireless wide area network (WWAN) protocol information and (b) the activity rate of the memory bus to control the physical operation of the processing circuit.

44. A method operational in a modem device for managing a performance level of a processing circuit, the method comprising:
monitoring wireless wide area network (WWAN) protocol information from a wireless wide area network (WWAN) protocol stack, including monitoring one or more of a downlink physical transport block size, an uplink scheduling grant, an automatic repeat request (ARQ) status, and a transmission buffer status;
identifying a processing circuit performance level associated with one or more of the downlink physical transport block size, the discovered uplink scheduling grant, the automatic repeat request (ARQ) outstanding window size, and the discovered transmission buffer status; and
adjusting at least one hardware operating parameter provided to the processing circuit in response to (a) the monitored wireless wide area network (WWAN) protocol information and (b) at least one of the downlink physical transport block size, the uplink scheduling grant, the automatic repeat request (ARQ) window size, or the transmission buffer status to control the physical operation of the processing circuit.

45. A modem device operable in an access terminal, comprising:
a wireless communication interface;
a memory device adapted to implement a wireless wide area network (WWAN) protocol stack for the wireless communication interface; and
a processing circuit communicatively coupled to the wireless communication interface and the memory device, the processing circuit adapted to:
monitor wireless wide area network (WWAN) protocol information from a wireless wide area network (WWAN) protocol stack, including monitoring one or more of a downlink physical transport block size, an uplink scheduling grant, an automatic repeat request (ARQ) status, and a transmission buffer status;
identify a processing circuit performance level associated with one or more of the downlink physical transport block size, the discovered uplink scheduling grant, the automatic repeat request (ARQ) outstanding window size, and the discovered transmission buffer status; and
adjust at least one hardware operating parameter provided to the processing circuit in response to (a) the monitored wireless wide area network (WWAN) protocol information and (b) at least one of the downlink physical transport block size, the uplink scheduling grant, the automatic repeat request (ARQ) window size, or the transmission buffer status to control the physical operation of the processing circuit.

* * * * *